Dec. 30, 1958  J. B. PARSONS  2,866,664
VERTICAL SEAT ADJUSTING MECHANISM FOR AUTOMOBILES
Filed Oct. 20, 1954  3 Sheets-Sheet 1

INVENTOR.
John B. Parsons
BY
ATTORNEY

Dec. 30, 1958  J. B. PARSONS  2,866,664
VERTICAL SEAT ADJUSTING MECHANISM FOR AUTOMOBILES
Filed Oct. 20, 1954  3 Sheets-Sheet 2

Inventor
John B. Parsons
By Malcolm W. Fraser
Attorney

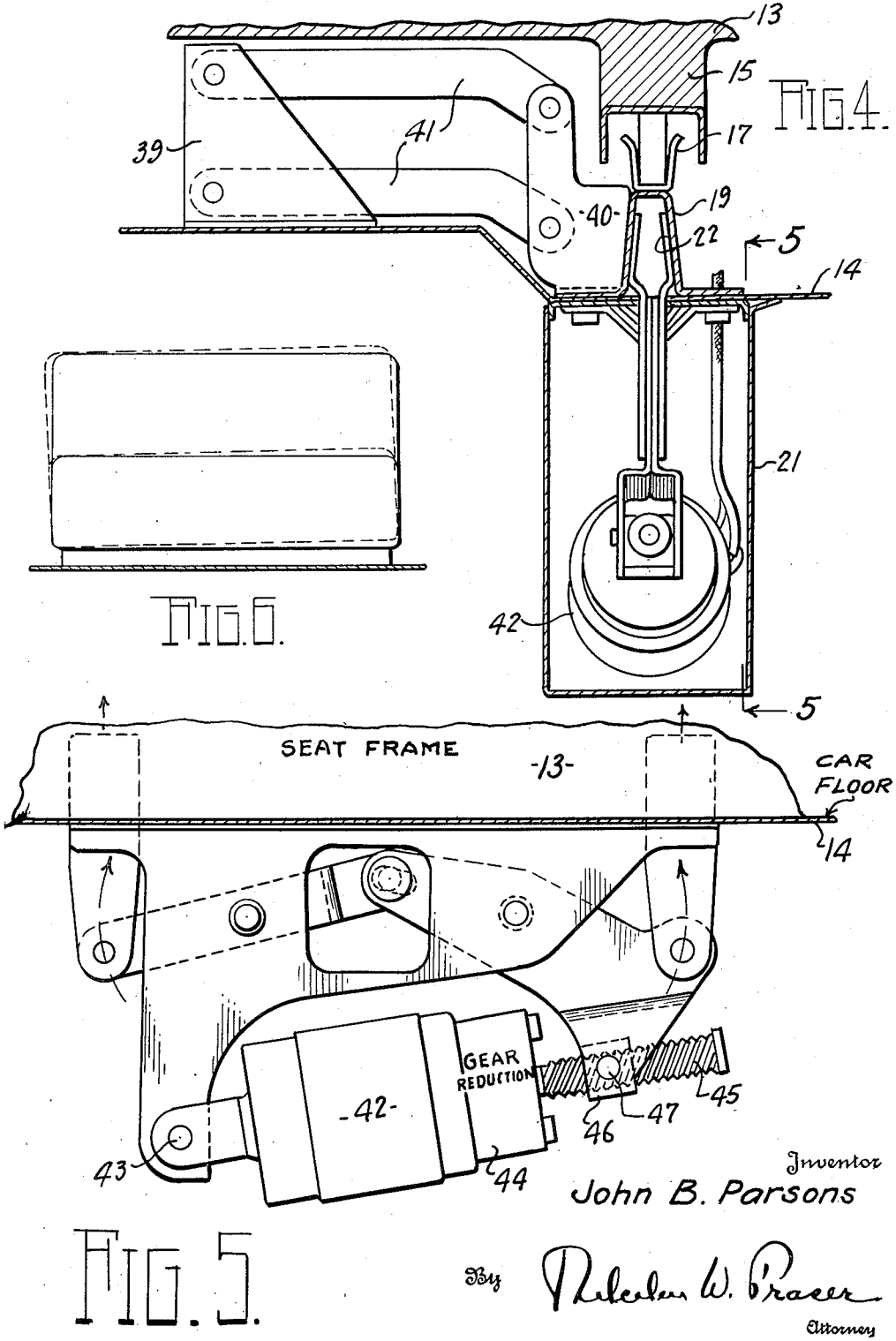

2,866,664
VERTICAL SEAT ADJUSTING MECHANISM FOR AUTOMOBILES

John B. Parsons, Maumee, Ohio

Application October 20, 1954, Serial No. 463,522

5 Claims. (Cl. 296—65)

This invention relates to seat adjusters for automobiles but more particularly to devices for elevating the front seat to the position best suited for the driver.

Elevating devices for the front seat of automobiles have heretofore been produced in which the entire seat is raised or lowered a slight amount in order to position the driver in the best possible position for road visibility. No infrequently it occurs that the other occupant of the front seat because height for example is not desirous of or is uncomfortable due to the seat adjustment best suited for the driver. Nevertheless, since the entire seat is adjusted for height to best accommodate the driver, the other occupant or occupants of the front seat must usually be resigned willy-nilly to the seat adjustment selected by the driver even though not best suited to their comfort or convenience.

An object of this invention is to enable height adjustment of the driver's side of the front seat without disturbing the remainder of the seat to any appreciable extent. This is achieved by raising or lowering the driver's end of the front seat and when elevated, the entire seat is tilted. However, since the entire lifting distance is less than an inch and a half, the degree of tilt is not noticeable but it affords adequate adjustment to position the driver in the most advantageous position without troubling the other passenger or passengers in the front seat.

Another object is to produce new and improved mechanism for vertically adjusting the front seat of an automobile which mechanism can be readily installed, is simple in construction, and easy to operate.

Other objects and advantages will hereinafter appear and for purposes of illustration but not of limitation, embodiments are shown in the accompanying drawings in which, Figure 1 is a fragmentary side elevation of an automobile, a portion of which is broken away to show the front seat and associated structure;

Figure 4 is a fragmentary sectional view of an alternate seat-adjusting mechanism employing an electric motor drive;

Figure 5 is a vertical sectional view substantially on the line 5—5 of Figure 4; and Figure 6 is a diagrammatic front elevational view of the front seat and back assembly showing by broken lines the up and down adjustment of the driver's side thereof.

Figure 1:
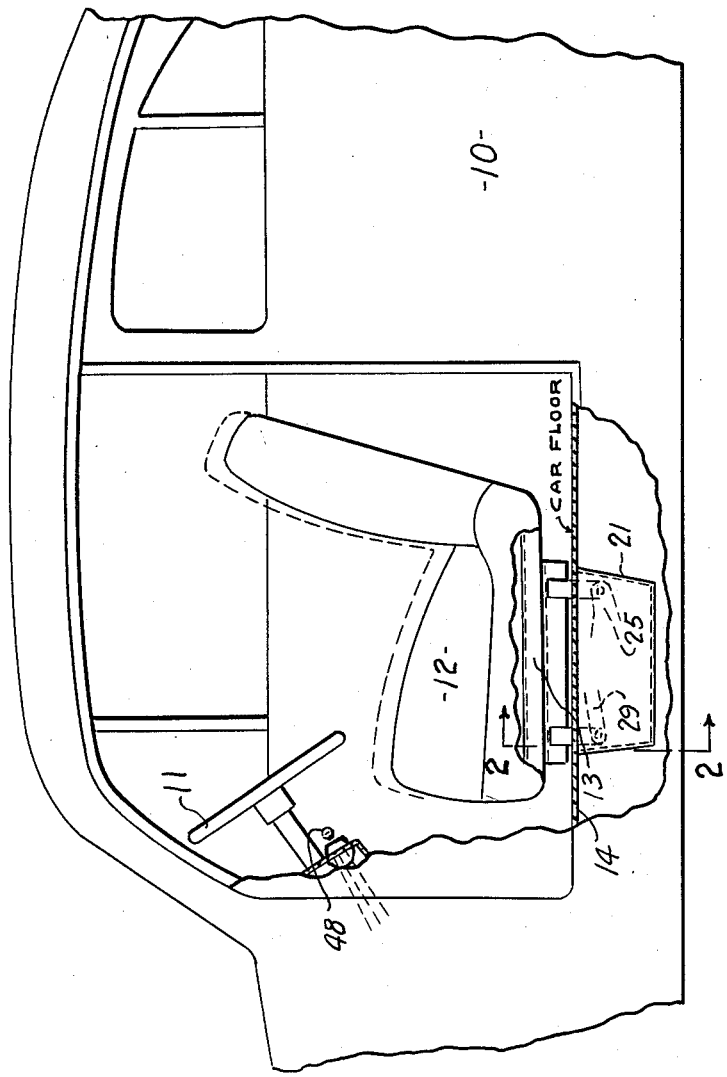

The illustrated embodiment of the invention comprises an automobile body 10 showing the steering wheel 11 and front seat and back assembly 12. The assembly 12 includes the seat cushion and upholstered and cushioned back and the seat cushion is suported by a seat frame 13 which is spaced upwardly from the car floor 14. Fixed to the seat frame 13 and depending therefrom are posts 15, one being arranged adjacent the front and one adjacent the rear end of the seat frame and disposed adjacent the side edge thereof. A similar arrangement of posts for the seat frame is provided on the opposite side edge of the seat.

Connected to the bottom edge of the posts 15 is a horizontally disposed track 16 which is of sheet metal and in cross-section in the form of an inverted U, there being an upwardly extending central depression 16a to provide a track along which rollers 18 may operate. The rollers also engage in a horizontally elongate U-shaped track 17 which is welded or otherwise suitably fixed to an upwardly extending support 19 which is in the form of an inverted U having lateral flanges 20 which in this instance are adapted to rest upon the car floor 14 when in their lowermost position. The construction on each side of the seat frame is identical up to this point except on the opposite side or that side remote from the driver's station, the flanges or wings 20 are fixed in any suitable manner to the car floor. Manifestly in this manner the seat may be adjusted forwardly and rearwardly by any suitable mechanism familiar to those skilled in this art. Such mechanism is not shown since the same forms no part of the present invention.

As shown, there is a housing 21 disposed beneath the car floor 14, the cover 21a of which is fixed to the underside of the car floor and has a depressed central portion 21b which is apertured at the front and rear ends to accommodate a pair of vertically disposed posts 22. Each post consists of two members welded to the inner sides of the inverted U-shaped support 19 with spaced depending parallel arms which extend through the opening in the cover 21a and as will be hereinafter described arms are pivoted between the lower ends of each of the pairs of posts 22.

A pair of bracket plates 24 have their upper ends secured as by welding to the underside of the cover 21a and these plates incline inwardly toward each other and thence extend downwardly to provide a mounting for the actuating arms and mechanism as will hereinafter be described.

Figure 3:
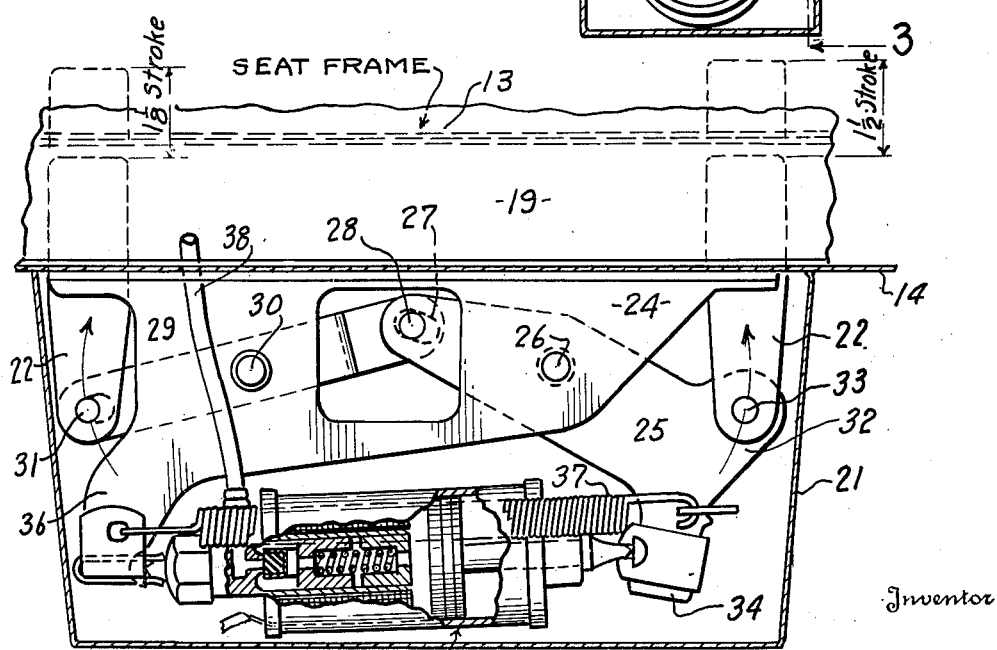
Figure 3 is a vertical sectional view substantially on the line 3—3 of Figure 2.

As shown in Figure 3 at the right hand side is a bellcrank arm 25 which has a portion disposed between the pairs of bracket plates 24 and is pivoted thereto by a pivot pin 26 extending through the bracket plates and engaging an intermediate portion of the arm. At the left hand side of Figure 3, it will be noticed that there is an arm 29 which also has a portion disposed between the bracket plates 24 and is pivotally mounted on a pivot pin 30 which extends through the bracket plates and engages an intermediate portion of the arm 29. At the outer end of the arm 29 is a pin and slot connection 31 with the lower end of the post 22, the arm being disposed between the spaced members of the post. The adjacent ends of the arms 25 and 29 meet midway of the housing 21 in the region of a slot 27 formed in the bracket plates 24 and a pin and slot connection 28 provides an operating connection between these two arms enabling the same to rock in an up and down manner as will be readily understood.

On the arm 25 is a lateral extension 32 which extends between the lower end of the adjacent post parts 22 to which a pin 33 affords a pivotal connection. Extending downwardly from the arm 25 is an integral extension 34 to which is connected one end of a linear motor in the form of a piston and cylinder assembly 35, the opposite end of this assembly being attached to an integral downward extension 36 of the bracket plates 24. Thus the bracket plates 24 provide the stationary mounting for the linear motor and the extension 34 of the bell crank arm 25 provides a movable extension so that upon operation of the linear motor the arm 25 and accordingly the arm 29 is rocked in one direction or the other, thereby to impart upward or downward movement to the post 22 to effect a raising or lowering of the vehicle seat assembly 12.

Reference is hereby made to my Patent 2,568,930 dated

September 25, 1951 and entitled "Seat Adjuster" wherein the form of linear motor is shown and described, the same consisting of a cylinder in which a solenoid controlled valve is disposed. By energizing the solenoid the valve is unseated to enable liquid under pressure to be introduced into the cylinder for actuating a piston thereby to rock the arms 25 and 29 in a direction to raise the seat and back assembly 12, it being understood that this operation takes place only on the driver's side of the seat. It will be observed that a pair of coil springs 37 arranged on opposite sides of the linear motor 35 are hooked over suitable members associated with the stationary bracket plate extensions 36 and the extension 34 of the bell crank 35. In this manner when the solenoid is energized to unseat the valve without forcing liquid under pressure into the cylinder or in other words merely to unseat the valve when the springs 37 are extended, it will be manifest that the springs 37 then will rock the arms in the direction to lower the post 22 and allow the seat 12 to move downwardly. Manifestly the operation of the springs 37 force the liquid from the cylinder but as soon as the solenoid controlled valve is seated, the liquid within the cylinder is trapped retaining the parts in the position of adjustment. As shown, a tube 38 leads to the cylinder and through which liquid is forced to the cylinder or allowed to return from the cylinder to a suitable reservoir.

In order to retain the seat and back assembly 12 against lateral shifting due to jars and shocks occasioned by road travel, an upstanding bracket 39 is fixed to the car floor 14 and another bracket 40 is fixed to the support 19 and connecting these two supporting brackets are parallel arms 41 pivotally connected at opposite ends to the respective brackets. If desired, a similar bracket and parallel arm assembly may be provided at the opposite side of the seat, thus allowing the tilting of the driver's side of the seat but obviating any tendency for lateral movement particularly when the seat is elevated. As shown in Figure 3, the maximum elevation is relatively small and as indicated, the front end of the seat has a maximum stroke of 1⅛" whereas the rear end of the seat has a 1½" stroke. In other words, those figures represent the maximum upward movement of the seat and this affords adequate elevation to position the driver in a most advantageous position with respect to the windshield and steering wheel. Naturally the elevation of the driver's side of the seat will provide a slight inclination to the seat as a whole but this is so slight as to be hardly perceptible. In fact in actual operation the other occupant or occupants of the seat have been found not to even notice any difference when the driver's side is raised to its fullest extent.

In the alternate form shown on Figures 4 and 5, an electric motor 42 is pivotally mounted at one end at 43 to the depending extensions 36 of the bracket plates 24. At the opposite end of the motor is a suitable gear reduction assembly 44 which is connected to operate a screw-threaded shaft 44. In engagement with the shaft 45 is a nut 46 which is pivotally connected to the downward extension 34 of the bell crank arm 25. Manifestly the electric motor 42, which is a reversible one, may be operated in one direction or another thereby to positively lock the arm 25 and thereby the arm 29 in one direction or the other for raising or lowering the seat as will be readily understood.

Figure 2:
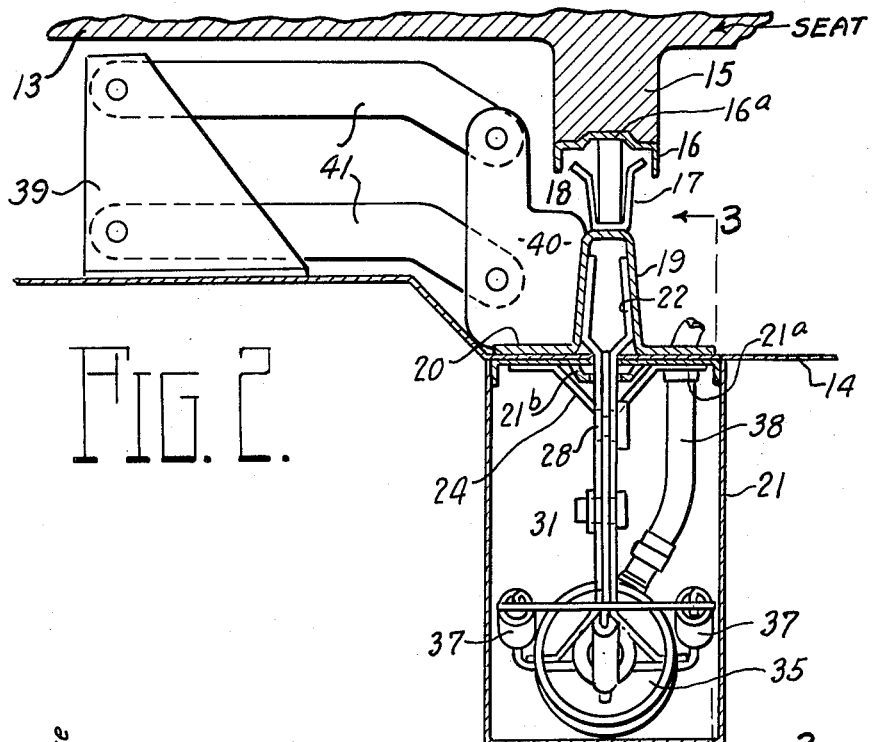
Figure 2 is an enlarged vertical sectional view on the line 2—2 of Figure 1.

As shown in Figure 1, there is a control switch 48 suitably disposed on the instrument panel of the automobile which upon actuation may operate either the electric motor 42 or in the case of the form shown on Figures 2 and 3, the motor pump assembly (not shown) and the solenoid controlling the valve within the cylinder. The electrical connections are not shown since the same will be manifest to those skilled in this art.

Numerous changes in details of construction, arrangement and operation may be effected without departing from the spirit of the invention, especially as defined in the appended claims.

What I claim is:

1. In an automotive vehicle having a steering wheel, a front seat in rear of the steering wheel extending transversely of the vehicle substantially from side to side, a pair of posts spaced from each other and depending from the driver's end of the seat, a lever for each post and pivoted at one end thereto, a pivotal mounting on the vehicle for an intermediate portion of each lever, a pin and slot connection between the other ends of said levers, linear motor means operating against one of said levers for effecting conjoint action thereof for tilting the seat, and means anchoring the opposite end portion of the seat against up and down movement.

2. In an automotive vehicle having a steering wheel, a front seat in rear of the steering wheel for occupancy of the driver and at least one other passenger extending transversely of the vehicle substantially from side to side, a pair of posts spaced from each other and depending from the driver's end of the seat, a lever for each post and pivoted at one end thereto, a pivotal mounting on the vehicle for an intermediate portion of each lever, a pin and slot connection between the other ends of said levers, hydroelectric linear motor means operating against one of said levers for effecting conjoint action thereof for tilting the seat, separate means for lowering the seat, and means anchoring the opposite end portion of the seat against up and down movement.

3. In an automotive vehicle having a steering wheel, a front seat in rear of the steering wheel for occupancy of the driver and at least one other passenger extending transversely of the vehicle substantially from side to side, a pair of posts spaced from each other and depending from the driver's end of the seat, a lever for each post and pivoted at one end thereto, a pivotal mounting on the vehicle for an intermediate portion of each lever, a pin and slot connection between the other ends of said levers, and a nut pivotally carried by one lever, a screw threaded shaft engaging said nut, reversible electric motor means for actuating said shaft, thereby to rock said levers conjointly in one direction or the other to raise or lower the driver's end of the seat, and means anchoring the opposite end portion of the seat against up and down movement.

4. In an automotive vehicle having a steering wheel, a floor, a front seat for occupancy of the driver and at least one other passenger supported on the floor and extending transversely substantially from side to side of the vehicle, mounting means for the seat enabling fore and aft movements thereof, and means including linear motor means disposed beneath the floor of the vehicle engaging said mounting means for bodily raising the driver's side of the seat.

5. In an automotive vehicle having a steering wheel, a floor, a front seat supported on the floor in rear of the steering wheel for occupancy of the driver and at least one other passenger, said seat constituting a unitary structure extending transversely of the vehicle substantially from side to side, the driver's end of said seat being movable in an up and down direction, means anchoring the opposite end of the seat against up and down movements, and power mechanism concealed from view and responsive to the control of the driver for bodily tilting only the end portion of the seat occupied by the driver for achieving selective height adjustments thereof.

References Cited in the file of this patent

UNITED STATES PATENTS

| | | |
|---|---|---|
| 2,277,875 | Macbeth | Mar. 31, 1942 |
| 2,510,517 | Osinski | June 6, 1950 |
| 2,572,910 | Brown | Oct. 30, 1951 |
| 2,596,033 | King | May 6, 1952 |
| 2,641,305 | Oishei | June 9, 1953 |